J. G. DUNHAM.
Reaping and Mowing Machine.
No. 2,472. Reissued Sept. 5, 1867.
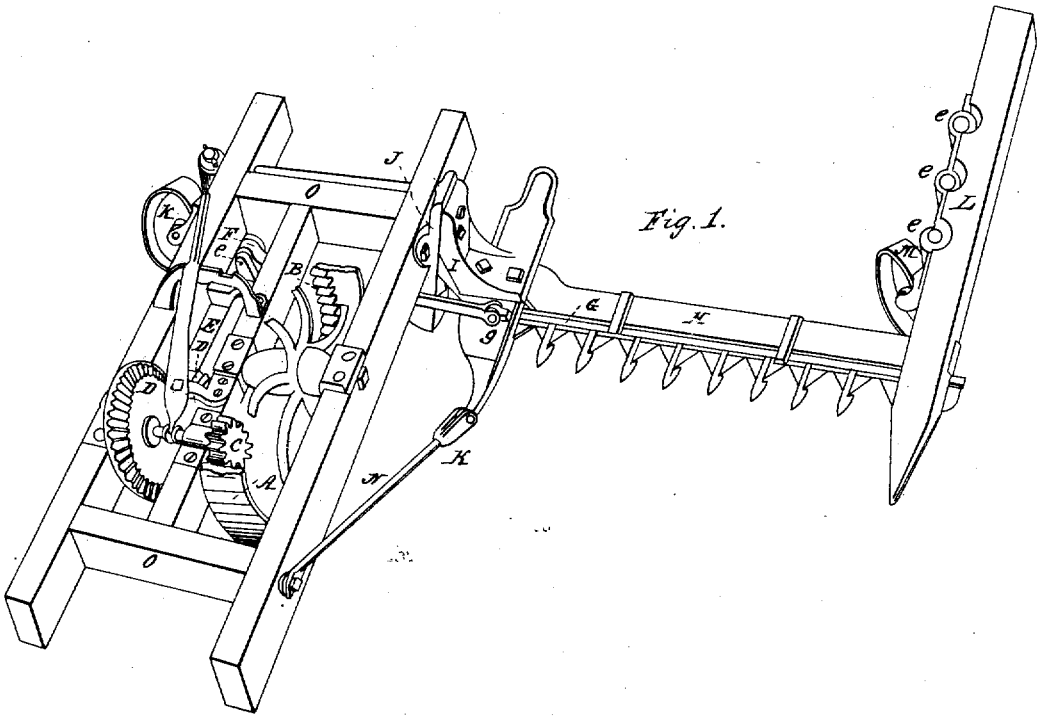
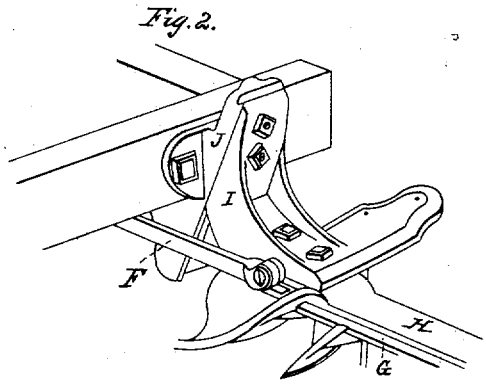
Inventor:
John G. Dunham.
N. PETERS, Photo-Lithographer, Washington, D. C.

United States Patent Office.

PETER V. STAATS, ADAM R. REESE, C. S. MELICK, ANDREW J. FARRAND, GEORGE SWEENY, JOHN W. DEAN, AND RUFUS SLIKER, OF RARITAN, NEW JERSEY, ASSIGNEES BY MESNE ASSIGNMENTS OF JOHN G. DUNHAM.

*Letters Patent No.* 18,238, *dated September* 22, 1857; *reissue No.* 2,472, *dated February* 5, 1867.

IMPROVEMENT IN REAPING AND MOWING MACHINES.

The Schedule referred to in these Letters Patent and making part of the same.

TO ALL WHOM IT MAY CONCERN:

Be it known that JOHN G. DUNHAM, of Raritan, county of Somerset, and State of New Jersey, did invent certain new and useful Improvements in Mowing and Reaping Machines, in maintaining the level of the sickle-beam as it is raised or lowered, and preserving its steadiness and that of the whole machine; and we do hereby declare that the following is a full and exact description thereof, reference being had to the accompanying drawings, and to the letters of reference marked thereon, and making a part of this specification.

The nature of this invention consists in so arranging and constructing the outer end of the sickle-beam that it can be sustained at different heights by the use of a single wheel, and thus, by this device, in combination with a device for adjusting the height of the inner end of the sickle-beam, both ends of the sickle-beam be kept on a level with each other.

Figure 1 is a general view of a machine showing the sickle-beam in connection.

Figure 2 is a detached view of the manner of connecting the sickle-beam to the frame.

The operation and character of this improvement are best illustrated by reference to the drawings, which show a cog machine, (so called,) the upper half of the driving-wheel being removed to show more plainly the connection of the various parts.

A is the driving-wheel, supported on the rectangular frame O O, and giving motion through the cogs B to pinion-wheel C, and through the bevelled gearing D to the crank-shaft E, which works the connecting-rod F vibrating the sickle-bar G, which moves in the sickle-beam H, as will be seen more clearly and distinctly from fig. 2. The slotted-frame J, in which the sliding-arm I of the sickle-beam moves up and down, is attached to the frame of the machine, with an inclination downwards and towards the crank-shaft or lever E, and, also, with an inclination forwards towards the driving-wheel. The sliding-arm I is also fixed to the sickle-beam upon an angle corresponding to the first or downward inclination above described, as given to the frame J, so that when the sickle-beam is connected with the machine, the beam and sickle will be horizontal or at right angles to the frame of the machine. The downward inclination of the frame J, or the obtuse angle made by it and the connecting-rod F is not, however, a fixed angle, but will vary according to the length of this connection, and will differ somewhat in different cases. This inclination, however, should be such, in all cases, that the distance from the lever or the end *e* of the crank-shaft E, to the end *g* of the sickle-bar, or, in other words, that the length of the connecting-rod F will be the same when the sickle is dropped near the ground for mowing or elevated for reaping. For convenience and economy of construction this inclination is straight, but its practical operation is the same as if it were a part or arc of a circle having a radius equal in length with the connecting-rod F, and, when desired or prefered, the faces of the frame J and sliding-arm I may be slightly curved. The forward inclination of the frame J is such as to correspond with the angle of the crank-shaft E, so that the connecting-rod F may have the same position in respect to the crank-shaft whether the sickle is raised or dropped, and prevent any twist or binding in the joint between the rod F and sickle-bar. This inclination will not, however, be required except when crank machines, (so called,) are used. If machines which give motion to the sickles by means of a lever instead of a crank, such as Dietz and Dunham's, patented 1855, are used, the slotted frame J will have given it only one and the downward inclination. The brace N is for supporting and strengthening the sickle-beam, and can be adjusted to the position of the sickle-beam as it is raised or dropped by removing the nut *h*, taking off the brace, and giving it a few turns as necessary in the nut *k*, and then refastening it with *h*; or any other plan of adjustment may be used, as preferred. The frame of the machine is supported and steadied by the caster-wheel K, which is of such a size that it will swing under the frame in turning, &c. In order to keep the outer end of the sickle-beam at the same height with the inner end as it is raised or lowered, and to elevate or lower such outer end by using but a single wheel, I incline the beam or bar L, as shown in the drawings, and attach thereto any desired number of sockets *l l l*, in which rests the caster-wheel M, and which can be transferred from one to the other by merely taking out the pin M. The beam L being inclined allows the wheel M to turn under it, whichever socket it may be placed in, and this wheel, being a pivot-wheel, will accommodate itself to the direction of the machine when being turned, and not draw sideways, tearing the ground, &c., and increasing the draught. The piece L is a stick of timber attached to the shoe or cutter-bar, intended for the support of the wheel M, and to it the platform is secured when the machine is used as a reaper. It is sustained by its attachment to the cutter-bar and by the wheel M. It has no connection with the frame in the rear of the cutter-bar as in other devices. It is carried in advance of the cutter-bar and forms the divider.

*Claim.*—1. The removable piece L attached to the shoe or cutter-bar, and extending over and in advance of the cutter-bar, in combination with a caster-wheel, M, attached to said piece L, substantially as and for the purpose specified.

2. Attaching the sickle-bar to the main frame by means of the sliding-arm I, and slotted frame J, the latter being longitudinally and laterally inclined, so that the height of the cut may be regulated without materially altering the relation of the guards to the knives, substantially as set forth.

3. The combination of the caster-wheel M, and a series of sockets *l l*, when the latter are attached to the piece L, and the former so arranged that it may turn under the platform, substantially as and for the purpose set forth.

In testimony whereof we have signed our names to this specification before two subscribing witnesses.

PETER V. STAATS,
ADAM R. REESE,
C. S. MELICK,
ANDREW J. FARRAND,
GEO. SWEENY,
JOHN W. DEAN,
RUFUS SLIKER.

Witnesses:
WM. A. HUFF,
BENJAMIN WYKER.